United States Patent
Ishii et al.

(10) Patent No.: US 6,696,809 B2
(45) Date of Patent: Feb. 24, 2004

(54) ROBOT, SERVO CIRCUIT, ACTUATOR, ROBOT CONTROL METHOD, AND ACTUATOR DRIVING METHOD

(75) Inventors: Shinji Ishii, Kanagawa (JP); Yoshihiro Kuroki, Kanagawa (JP)

(73) Assignee: Sony Corporation, Tokyo (JP)

( * ) Notice: Subject to any disclaimer, the term of this patent is extended or adjusted under 35 U.S.C. 154(b) by 180 days.

(21) Appl. No.: 10/032,723

(22) Filed: Oct. 27, 2001

(65) Prior Publication Data

US 2002/0079857 A1 Jun. 27, 2002

Related U.S. Application Data

(62) Division of application No. 09/701,396, filed on Jan. 19, 2001, now Pat. No. 6,472,839.

(30) Foreign Application Priority Data

Apr. 5, 1999 (JP) .......................................... 11-097150

(51) Int. Cl.$^7$ .............................. G05B 13/04; B25J 9/00
(52) U.S. Cl. ................. 318/561; 318/568.22; 318/621; 318/632
(58) Field of Search ............................... 318/567, 568.1, 318/568.22, 621, 561, 632

(56) References Cited

U.S. PATENT DOCUMENTS

| | | | | |
|---|---|---|---|---|
| 4,792,737 A | * | 12/1988 | Goff et al. | 318/615 |
| 5,343,397 A | | 8/1994 | Yoshino et al. | |
| 5,352,961 A | * | 10/1994 | Tajima et al. | 318/561 |
| 5,637,974 A | * | 6/1997 | McCann | 318/701 |
| 6,014,598 A | * | 1/2000 | Duyar et al. | 701/29 |

FOREIGN PATENT DOCUMENTS

| | | |
|---|---|---|
| EP | 0 478 393 | 4/1992 |
| JP | 4-141379 | 5/1992 |
| JP | 4-201190 | 7/1992 |

* cited by examiner

Primary Examiner—Bentsu Ro
(74) Attorney, Agent, or Firm—Frommer Lawrence & Haug LLP; William S. Frommer; Gordon Kessler

(57) ABSTRACT

Based on a control object, a result of the detection of driving of an actuator and a response from a standard mathematical model of the actuator, the actuator is controlled, or in a servo system that controls the angle of a joint, etc., the control value is corrected so that the response from the thing to be driven and the response from the model of the thing to be driven are set to coincide with each other, and also based on a result of the correction of the control value, at least the moment of inertia of the thing to be driven is detected. Thereby, the moment of inertia of the driver and the like can be detected in real-time without providing a special sensor.

2 Claims, 8 Drawing Sheets

ROBOT, SERVO CIRCUIT, ACTUATOR, ROBOT CONTROL METHOD, AND ACTUATOR DRIVING METHOD

This application is a divisional application of copending U.S. patent application Ser. No. 09/701,396, filed Jan. 19, 2001, now U.S. Pat. No. 6,472,839.

TECHNICAL FIELD

The present invention relates to robots, servo circuits, actuators, robot control methods, and actuator driving methods, and can be applied to, for example, two- or four-legged mobile robots. The present invention allows the moment of inertia of a driver and the like to be detected in real-time without providing special sensors, by controlling an actuator based on a control object, a result of detecting the movement of the actuator and a response from a standard mathematical model of the actuator; and also in a servo system or the like, by correcting a control value so that responses from an object to be driven and a model of the object to be driven are identical and moreover, by detecting at least the moment of inertia of the object to be driven based on a result of the control value correction.

BACKGROUND ART

Hitherto, a legged mobile robot that uses two legs to move can be moved with the two legs by controlling a plurality of joint actuators provided in the legs. FIG. 8 is a skeleton view showing a schematic construction of a two-legged mobile robot of the above-described type. A right leg 3R and a left leg 3L are joined to a body 2.

For the right leg 3R and the left leg 3L, actuators for controlling joint angles are provided corresponding to, for example, thighs, knees, and ankles, and the right leg 3R and the left leg 3L are joined to the body 2 by actuators M1R and M1L that rotate treating the vertical direction as a rotational axis. Here, for the joints corresponding to the thighs and the ankles, actuators M2R and M3R, and M2L and M3L that rotate regions lower than the thighs back and forth and right and left are provided, and for the joints corresponding to the knees, actuators M4R and M4L that rotate regions lower than the knees back and forth are provided. In addition, for the joints corresponding to the ankles, actuators M5R and M6R, and M5L and M6L that rotate regions which are in contact with the ground back and forth and right and left are provided.

A legged mobile robot 1 detects the operations of the actuators M1R to M6R and M1L to M6L using sensors, and uses a servo loop to control the operations of the actuators M1R to M6R and M1L to M6L. In the body 2 of the legged mobile robot 1, an attitude sensor (gravity sensor for detecting the direction of gravity) that detects an attitude is provided, and a force sensor, a contact sensor, etc., are provided in each region of the legs 3R and 3L, whereby these sensors detect an inclination or the like of the body 2 and correct a control object in each servo loop. These enable this type of robot to perform two-leg walking by setting the control object in each servo loop so that the attitude is successively changed.

FIG. 9 is a block diagram showing a servo circuit that drives an actuator and a control system positioned higher than it. In the legged mobile robot 1, a control command generator 11 executes, for example, interpolation-operation processing using a basic control object for each actuator, which is used for two-leg walking, whereby a control object value for each actuator is sequentially generated. The control command generator 11 sequentially outputs each control object value to the servo circuit 12, and inputs each control object to an optimization regulator 13. In FIG. 9, the reference letter S is a Laplace operator.

Each servo circuit 12 uses a multiplier 15 to multiply a differential value of each control object value by gain coefficient Kf. Also, each servo circuit 12 acquires the rotational speed information Vm of each actuator and displacement information Pm based on a rotation angle by using an output from the sensor provided for each actuator. Disturbance Td, caused by, for example, roughness of a floor, is added to the rotational speed information Vm and the displacement information Pm.

Each servo circuit 12 generates an error signal "ep" by using a subtractor 14 to subtract the displacement information Pm from the control object value, and uses a multiplier 16 to amplify the error signal ep by gain coefficient Kp0. Each servo circuit 12 adds thus obtained outputs from the multipliers 15 and 16, and outputs the sum to an actuator driving circuit 18.

A subtractor 20, which is provided for each control object value, subtracts each control object from the corresponding displacement information Pm, and inputs the obtained value to the optimization regulator 13.

The optimization regulator 13 acquires the displacement information Pm from each servo circuit, and acquires a detection result from each sensor such as an attitude sensor. Thereby, when a control object value, caused by two-leg walking, is output from, for example, the control command generator 11 to each servo circuit, the optimization regulator 13 monitors the state of each actuator operated by each servo circuit, and monitors a change in the attitude, contact with the ground, etc., thereby outputting, based on the monitoring results, the amount of operation for correcting performance of each servo circuit so as to cope with roughness of the ground.

The driving circuit 18 controls the rotation of the motor M by so-called "PI control". In other words, the driving circuit 18 adds the amount of operation to an output value eV generated based on the error signal ep by an arithmetic circuit 24, and subtracts the rotational speed information Vm of a motor main unit 22 as the driver. The driving circuit 18 computes a torque Tm which is required for driving the motor M by using a multiplier 25 and an integrator 26 to sequentially process the arithmetic processing result, and the motor M is driven by current driving in accordance with the torque Tm.

Accordingly, the motor M has such a small coefficient of static friction as can almost be ignored. Thus, the use of moment of inertia Jx and coefficient of viscous friction Dm can express a transfer function as a motional impedance. Therefore, in FIG. 9, the motor M, each integrator, each multiplier, etc., are indicated using the representation in Laplace operation. The motor M outputs the displacement information Pm by using a position-detecting sensor 19 provided on the rotational axis.

This enables the legged mobile robot 1 to correct the control object in each servo circuit based on a detection result obtained by the attitude sensor, etc., whereby, when the legged mobile robot 1 walks on a rough floor thereon, it changes the positions of joints of the ankle, the center of gravity, etc., in accordance with the roughness on the floor.

In the case that a control object in each servo circuit is corrected based on a detection result obtained by an attitude sensor, etc., as described above, a force sensor, a contact sensor, etc., must be provided for each component constituting legs, and the provision for each component causes a problem in that the entire structure is complicated and enlarged.

The enlargement and increase in weight causes a further problem in that increasing the operation speed of the entire robot is difficult. A force sensor for this type has small rigidity, which makes it difficult to accelerate the operation speed of the entire robot.

Moreover, when it becomes difficult to cope with an unpredictable change in a load, the movement is unstable due to the load change depending on the level of difficulty. Therefore, after all, with contact sensors provided for parts that touch the ground, it is required that the load change be predicted.

In the above-described construction in FIG. 8, concerning the motors M6R and M6L for rotating the ground-contact parts the right and left, at the moment the left foot breaks contact with the floor after the right foot touches the floor, the load moment of inertia of the motor M6R for the right foot is maximum, and the load moment of inertia of the motor M6L for the left foot is minimum. In walking, the load moment of inertia repeatedly reaches its maximum and minimum, and the attitude of the entirety causes a complicated change in the load moment of inertia of each motor.

Differently from the above-described case, prediction of the roughness of the floor is difficult. Thus, it is required that a change in the load be predicted using contact sensors provided for ground-contact parts. In this way, if an unpredicted disturbance is generated, or an unpredicted change in the moment of inertia is generated, the amount of operation by the optimization regulator 13 and control of the driving circuit 18 are finally unstable.

If the moment of inertia of the motor, etc., can be detected without providing the above-described type of dedicated sensor, it is possible that the above-described type of problem can be solved once by changing the amount of operation, based on a result of the detection.

DISCLOSURE OF INVENTION

The present invention is made in view of the foregoing points, and is intended to propose a servo circuit and actuators that can detect the moment of inertia, etc., of a driving system in real-time, and to propose a robot or the like using these.

To solve the foregoing problems, in the invention, a robot includes an actuator-driving system for driving each actuator in accordance with a control value and a model-driving system for driving a model of each actuator in accordance with the control value; and corrects the control value, which is to be input to the actuator-driving system and/or the model-driving system, so that a response from each actuator and a response from the model coincide with each other, detects at least the moment of inertia of each actuator from a result of the correction, and outputs the value as a result of the driving.

As a result, by correcting a control value to be input to an actuator driving system and/or a model driving system so that responses from an actuator and a model coincide with each other, the robot can detect a moment of inertia of the actuator in real-time based on a result of the correction with a moment of inertia set for the model as a reference. Thereby, by correcting the control value based on the detection result, it is possible to cope with an unpredictable disturbance without providing a special sensor.

Further, in the invention, a robot controls actuators based on control objects, results of detection, and responses from a standard mathematical model.

As a result, a robot controls each actuator by correcting the control object for an unpredictable disturbance based on the detection result and the response from the standard mathematical.

Further, in the invention, a servo circuit comprises an actuator driving system for driving actuators in accordance with control values; a model driving system for driving models of the actuators in accordance with the control values; and a control means which corrects each control value to be input to the actuator driving system and/or the model driving system so that a response from each actuator and a response from each model coincide with each other, detects at least the moment of inertia of each actuator from a result of the correction, and uses the result of the correction to correct each control value to be input to the actuator driving system and the model driving system.

As a result, since, the servo circuit corrects each control value to be input to an actuator driving system and/or a model driving system so that a response from an actuator and a response from a model coincide with each other, and corrects the control value after detecting at least a moment of inertia of the actuator using the correction result, a servo circuit capable of coping with an unpredictable disturbance can be constructed without providing a dedicated sensor.

Further, in the invention, an actuator includes a correcting means for correcting a control value, which is input to a driver driving system and a model driving system, so that a response from the driver and a response from the model coincide with each other, whereby at least the moment of inertia of the driver is detected from a result of the correction by the correcting means and is output.

As a result, since the servo circuit corrects each control value to be input to an actuator driving system and/or a model driving system so that a response from an actuator and a response from a model coincide with each other, and detects at least a moment of inertia of a driver from a result of the correction, a moment of inertia of the driver can be transferred to a higher-ranked control mechanism without providing a special sensor in order to cope with an unpredictable change in a load on the driver, similarly to a case where such a sensor is provided.

Further, in the invention, a robot control method controls each actuator based on a control object, a result of driving each actuator and a response from a standard mathematical model for a control object.

As a result, the robot control method controls each actuator based on a control object, a result of driving the actuator and a response from a standard mathematical model of the control object, the control object can be corrected from the detection result and a response from the standard mathematical model, coping with an unpredictable disturbance.

Furthermore, in the invention, an actuator driving method drives a model of a driver in accordance with a control value; detects at least the moment of inertia of the driver based on a result of the driving of the model and a result of the driving of the actuator; and outputs it.

As a result, since the actuator driving method drives a model of a driver in accordance with a control value; detects at least the moment of inertia of the driver, based on a result of the driving of the model and a result of the driving of the actuator; and outputs it, the moment of inertia of the driver can be transferred to a higher-ranked control mechanism, coping an unpredictable change in a load on the driver.

BEST MODE FOR CARRYING OUT THE INVENTION

An embodiment of the present invention is described below with reference to the attached drawings.

(1) Construction of Embodiment

Figure 2:
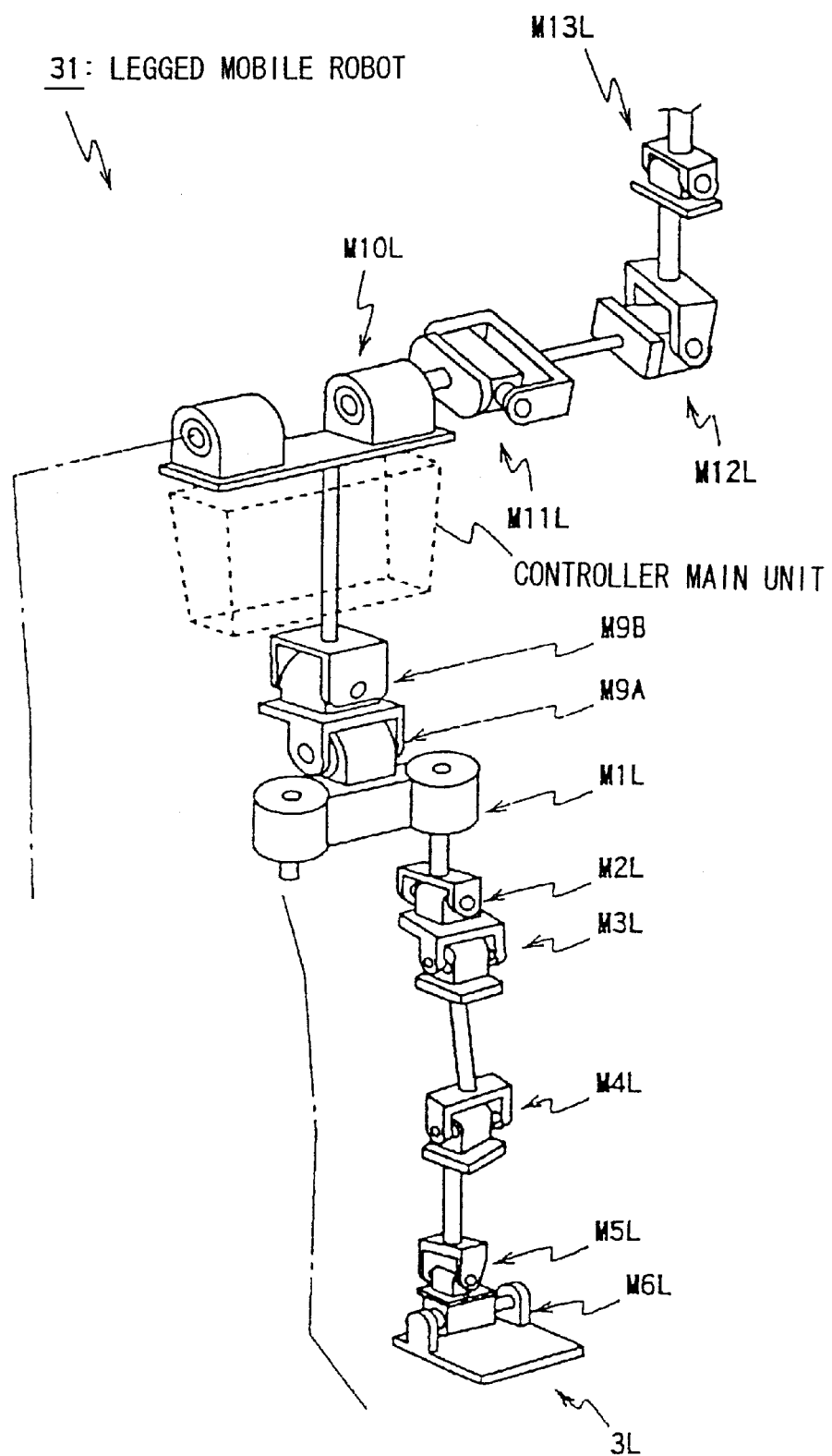
FIG. 2 is a schematic drawing showing the structure of the legged mobile robot in FIG. 1.
Figure 8:
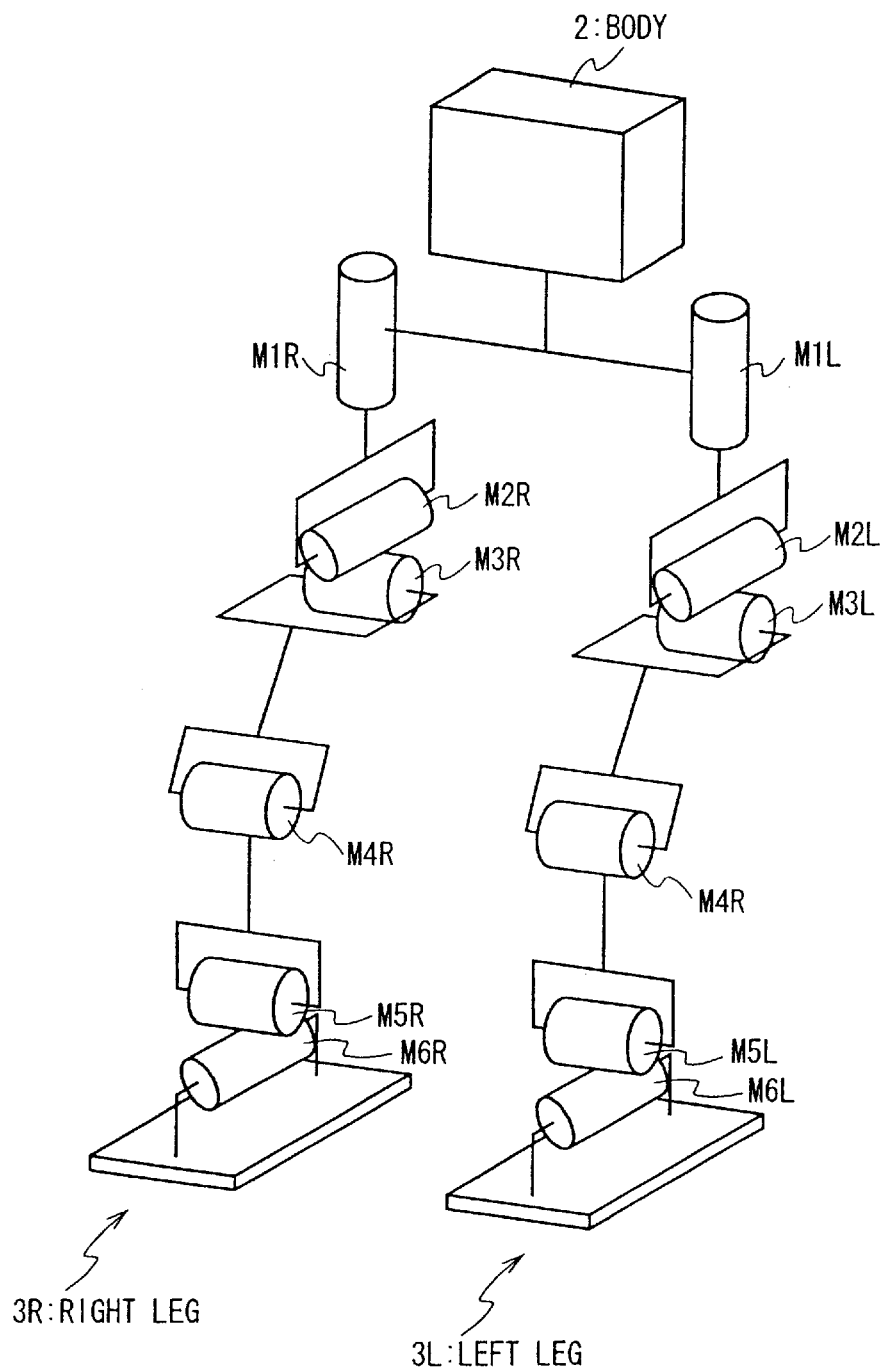
FIG. 8 is a skeleton view showing an outline structure of a legged mobile robot.
Figure 9:
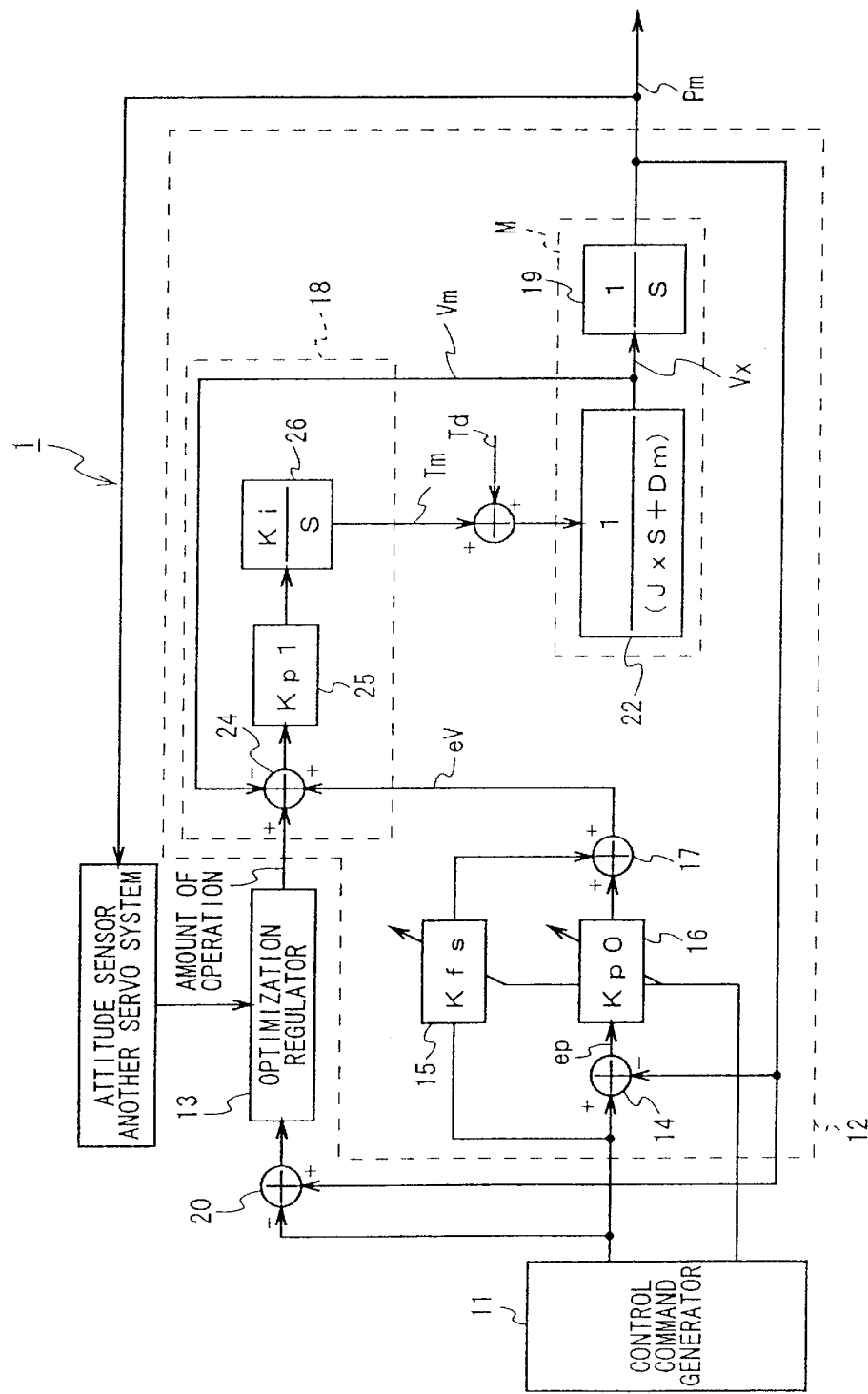
FIG. 9 is a block diagram showing a servo system applied to a conventional legged mobile robot.

FIG. 2 is a schematic drawing showing a legged mobile robot according to an embodiment of the present invention in comparison with FIG. 8. Concerning this legged mobile robot 31, leg parts are assembled similarly to the legged mobile robot 1 described with reference to FIG. 8, and in addition to the legs, arms can also be assembled so as to move by actuators M10L to M13L. For also a waist part, actuators M9A and M9B are provided, which can move the center of gravity back and forth, and right and left. In FIG. 2, components corresponding to those of the legged mobile robot 1 described using FIG. 8 are denoted by the same reference numerals, though the details differ. In the legged mobile robot 31, the left side and the right side of the body are identical in structure. Accordingly, in FIG. 2, descriptions of the right-leg side and the right-arm side are omitted.

Figure 3:
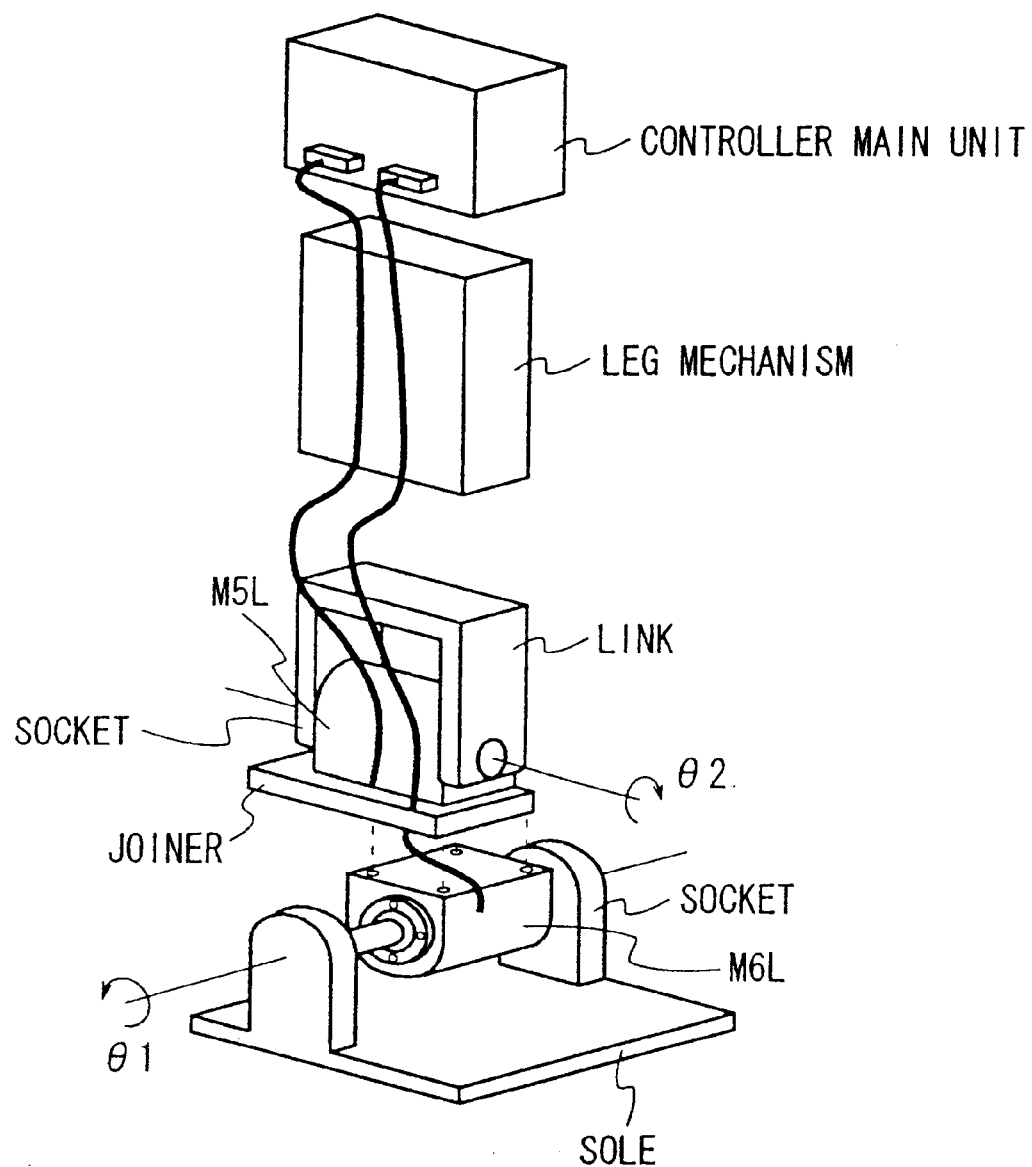
FIG. 3 is a perspective exploded view showing the details of the sole portion in FIG. 2.

FIG. 3 is a perspective exploded view showing the peripheral structure of actuators M5L and M6L which are positioned at the tip of a left leg 3L. The legged mobile robot 31 includes a sole touching the ground, and the actuator M6L, which has an axis perpendicular to the front of the legged mobile robot 31, is provided on the sole. This enables the legged mobile robot 31 to rotate the sole by driving the actuator M6L, as shown in reference numeral θ1.

In the legged mobile robot 31, the actuator M6L is joined to the actuator M5L by a joiner, and the rotational axis of the actuator M6L is positioned to be perpendicular to the rotational axis of the actuator M6L. This enable the legged mobile robot 31 to rotate the sole right and left by driving the actuator M5L, as denoted by reference numeral θ2. Accordingly, the legged mobile robot 31 drives the actuators M5L and M6L in association with other actuators and inclines the sole back and forth, and right and left, in accordance with a rough floor, thereby enabling walking even on a rough floor.

Figure 4:
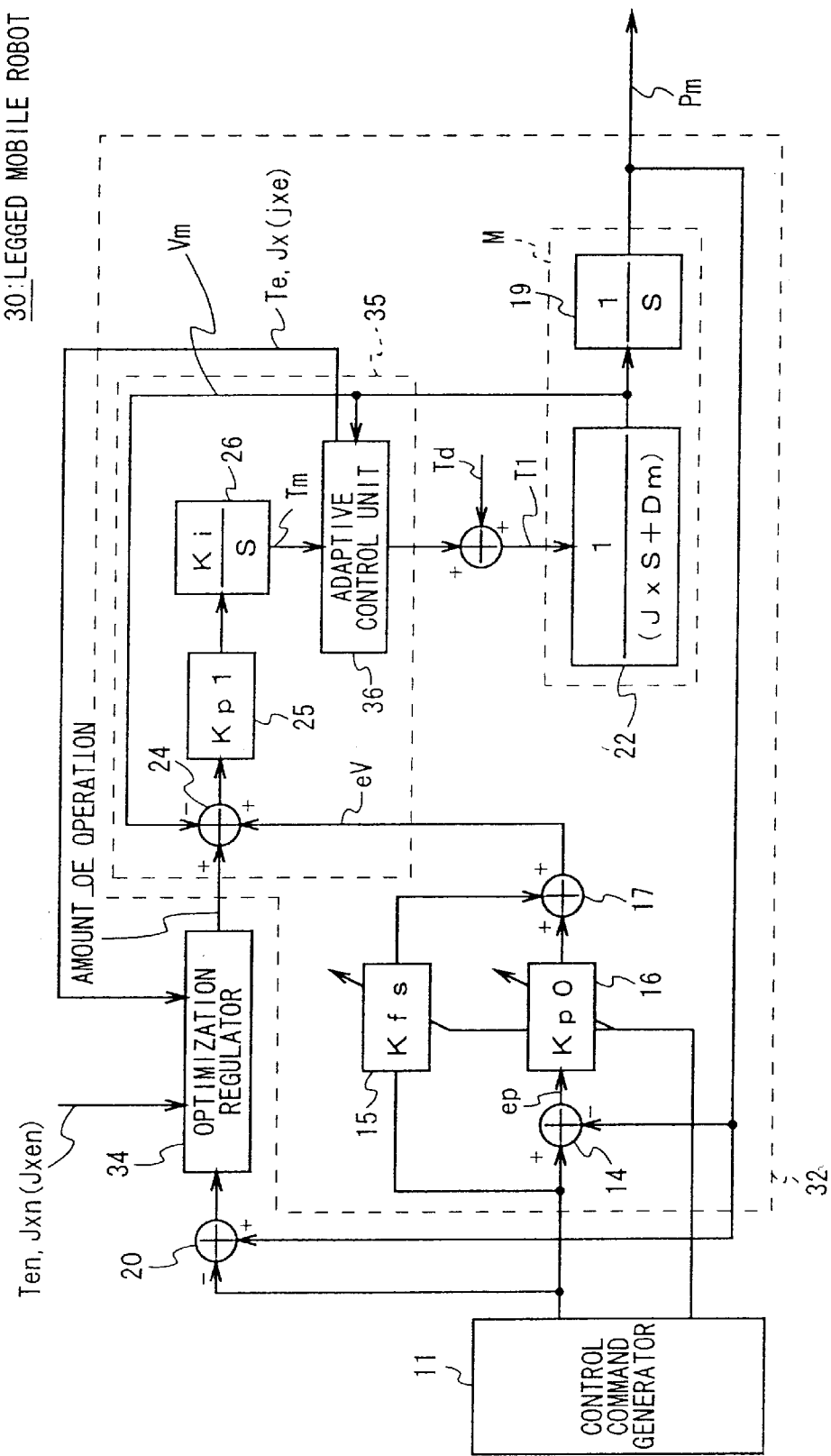
FIG. 4 is a block diagram showing a servo system to which the adaptive control unit in FIG. 1 is applied.

FIG. 4 is a block diagram showing a servo circuit relating to one actuator in a legged mobile robot of the present invention, and a control system at a higher position than it. The legged mobile robot 31 uses a servo circuit 32 and a servo circuit according to another actuator, which is not shown, to detect the moment of inertia of an actuator and a load caused by a disturbance in real-time, and notifies an optimization regulator 34 of them. The optimization regulator 34 generates the amount of operation based on the moment of inertia and the load caused by the disturbance, and notifies each servo circuit of it, instead of the result of the detection by each sensor, which is described above with reference to FIG. 8.

In other words, in the servo circuit 32, a driving circuit 35 in each actuator includes an adaptive control unit 36 which is provided between an integrator 26 and a motor M, and the adaptive control unit 36 is used to detect the moment of inertia Jx and load Td caused by disturbance in real-time.

Figure 1:
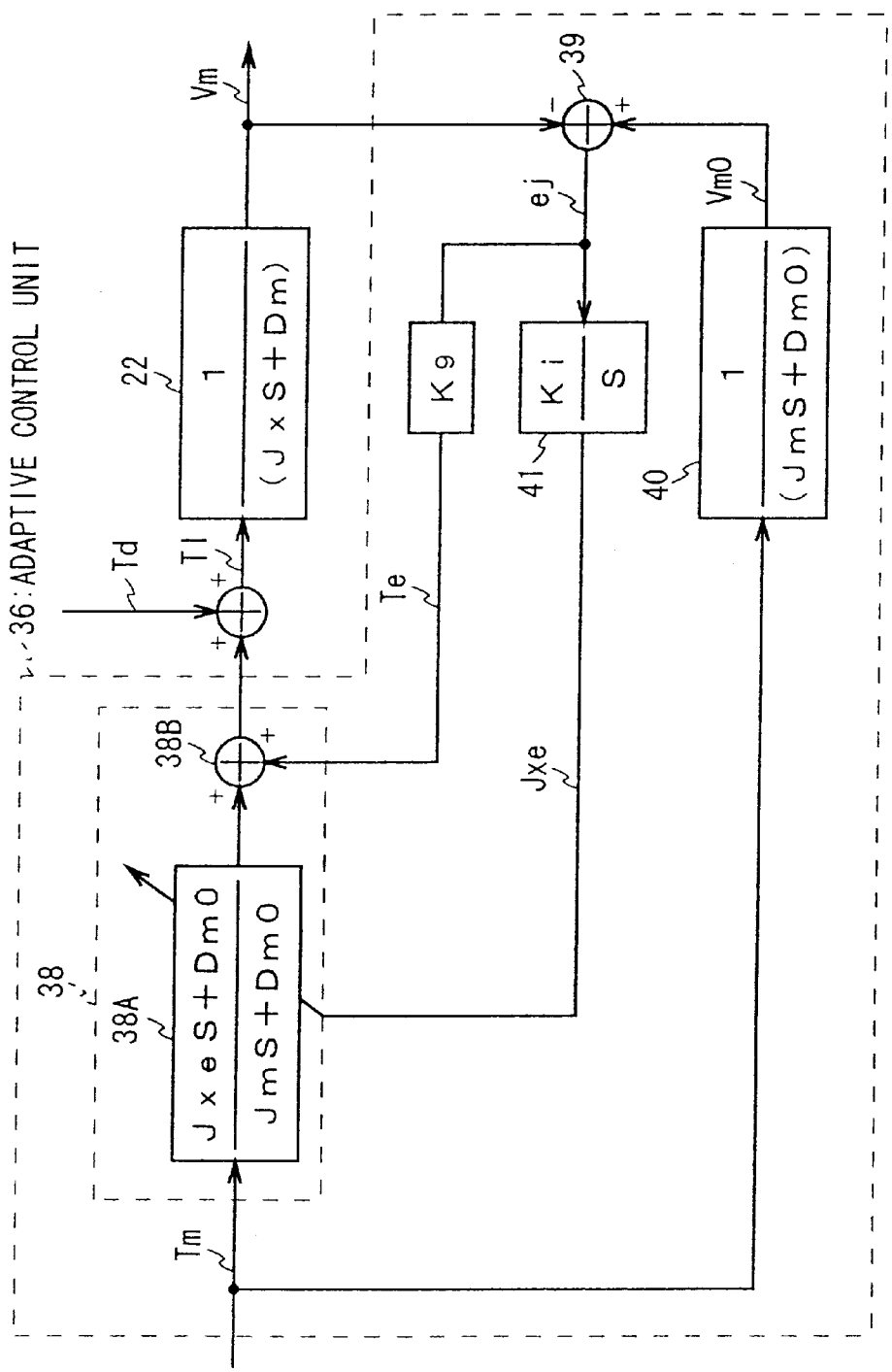
FIG. 1 is a block diagram showing an adaptive control unit for a legged mobile robot according to an embodiment of the present invention.

FIG. 1 is a block diagram showing the structure of the adaptive control unit 36. The adaptive control unit 36 uses an adjuster 38 to correct the torque control value Tm, and drives the motor M. The adaptive control unit 36 also acquires the angular velocity information Vm as a response from the motor M by using a angular velocity sensor provided for the rotational axis of the motor M, and inputs it to a subtractor 39. Accordingly, the driving circuit 35 forms a driving system for an actuator which drives the motor M, the actual object to be driven.

The adaptive control unit 36 gives the torque control value Tm to the standard mathematical model 40, and computes and inputs the response Vm0 to the subtractor 39. Here, the standard mathematical model 40 is a model of the motor M which is set to transfer function 1/(JmS+Dm0) based on dimensions equal to the motional impedance of the motor M, and is set so as to output response Vm0 in the form of a rotational speed similar to that of response Vm from the motor M. This enables the driving circuit 35 to constitute the driving system of a model that drives a model of the motor M. Here, Jm is a constant corresponding to the moment of inertia Jx of the motor M. Dm0 is a coefficient corresponding to the viscous friction coefficient Dm of the motor M. In this embodiment, predetermined fixed values are set to Jm and Dm0, and a measured value of the motor M is set to Dm0.

The subtracter 39 detects an error ej between the response Vm from the motor M and the response Vm0 form the standard mathematical model 40. The adaptive control unit 36 controls the amount of correction by the adjuster 38 so that the error ej is converged to a value of zero, and detects the moment of inertia Jx and the load Td caused by the disturbance in real-time in accordance with a result of the correction and notifies the optimization regulator 34 of the detected values.

The adaptive control unit 36 uses an output value Jxe from the integrator 41 and the error ej to adjust the adjuster 38.

The adjuster 38 includes an adjuster 38A that uses the output value Jxe of the integrator 41 to control the gain of the torque control value Tm and a multiplier 38B that gives an offset value in accordance with the error ej to the torque control value Tm. In other words, the adjuster 38A is set to have transfer characteristics represented by (JxeS+Dm0)/(JmS+Dm0) with the transfer function 1/(JmS+Dm0) of the model as a reference, and the numerator Jxe is set as the output value Jxe of the integrator 41.

Conversely, the adder 38B offsets the control value by adding a value Te obtained by amplifying the error ej with a predetermined gain Kg.

As a result, the error ej can be expressed by the following expression.

$$ej = Tm\left[\frac{1}{JmS + Dm0}\right] - \left[Tm \times \left[\frac{JxeS + Dm0}{JmS + Dm0}\right] + Kg \times ej + Td\right]\left[\frac{1}{JxS + Dm}\right] \quad (1)$$

Here, letting the gain of the integrator 41 be Ki, the output Jxe of the integrator 41 can be expressed by the following expression.

$$Jxe = ej \times \frac{Ki}{s} \quad (2)$$

And in the expression (1), the motional friction coefficient Dm and Dm0 are known values and Dm=Dm0.

Therefore, by substituting the expression (2) for the expression (1), the following relational expression can be obtained.

$$ej = \frac{Tm \times JxS - Td \times Z40}{(JxS + Dm)Z40 + Ki \times Tm + Kg \times Z40} \quad (3)$$

$$\text{but } Z40 = (JmS + Dm0)$$

Here, JmS+DM0 in the expression (3) is a mathematical model created by Motor·Rotor and it is a prerequisite that the pole is stable.

Accordingly, by setting Ki×Tm>0 and Kg×Tm>0, the error ej can be converged to zero, and the response from the motor M can be set to be identical to the response from the standard mathematical model 40. At this time, the output Jxe from the integrator 41 is identical to the moment of inertia Jx, which includes the load on the motor M, and the value Te, obtained by amplifying the error ej with the predetermined gain Kg, is identical to the external force Td.

Therefore, the gain by the adjuster 38A and the offset value in the adder 38B are adjusted in the adaptive control unit 36 so that the error ej can be converged to zero, whereby the moment of inertia of the motor M and the load caused by the disturbance are detected in real-time.

Accordingly, the adaptive control unit 36 uses a built-in arithmetic processing circuit to execute a predetermined process, thereby constituting the adjuster 38, the model 40, the subtracter 39, the integrator 41, etc. By using the arithmetic processing circuit to constitute a correcting means for correcting the control value Tm to be input to the actuator driving system relating to the motor M, the moment of inertia of the motor M and the load caused by the external force are detected based on a result of the correction.

(2) Operation of the Embodiment

In the above-described construction, in the robot 31 (FIG. 4), control object values for actuators are generated by the control command generator 11, and the control object values are sequentially output to the servo circuits for the actuators. In each servo circuit 32, a differential value of each control object value is amplified with the predetermined gain Kf to generate the control value eV of each driving circuit, and the control value eV is used to drive the motor M. At this time, after the control value eV is amplified with the predetermined gain Kp1, it is integrated by the integrator 26 having the gain Ki, whereby a control object value based on the torque Tm is generated, and current driving corresponding to the torque Tm is used to drive the motor M. In addition, the error signal ep is detected between the driving result Pm and the control object, and the control object value is corrected by amplifying the error signal ep with the predetermined gain Kp0, whereby the motor M is driven by a servo loop by a feedback loop.

At this time, the gain of the control value Tm and the offset value are corrected by the adjuster 38 in each driving circuit (FIG. 1), whereby the motor M is driven based on a result of the correction, and the response from the motor M is detected as a result of detection of the angular velocity of the motor M. Also, the standard mathematical model 40 of the transfer model based on dimensions equal to those of the motor M is used to detect the response Vm0 to the control value Tm. The responsive error ej to the motor M and the standard mathematical model 40 is detected by the subtractor 39, the gain of the control value Tm is corrected by the adjuster 38A in the adjuster 38 so that the error ej is converged to a value of zero, and the offset value Te is corrected by the subsequent adder 38B.

Accordingly, the driving circuit 35 sequentially corrects the characteristics of the adjuster 38, using the error ej obtained by correcting the control value Tm on the side of the motor M, and the control value Tm on the side of the motor M is corrected so that the response Vm from the motor M is set to coincide with the response Vm0 from the standard mathematical model 40, to drive the motor M.

In this condition, the driving circuit 35 sets the adjuster 38A to transfer characteristics represented by (JxeS+Dm0)/(JmS+Dm0) with the transfer function 1/(JmS+Dm0) of the standard mathematical model 40 as a reference, and the gain of the control value Tm is controlled by setting the numerator Jxe to the output value Jex of the integrator 41, whereby the output value Jxe from the integrator 41 represents the moment Jx of inertia of the motor M with the error ej being converged to the value zero.

The offset value Te, which is given to the control value obtained by correcting the gain as described above, represents the load Td caused by the disturbance to the motor M.

Figure 5:
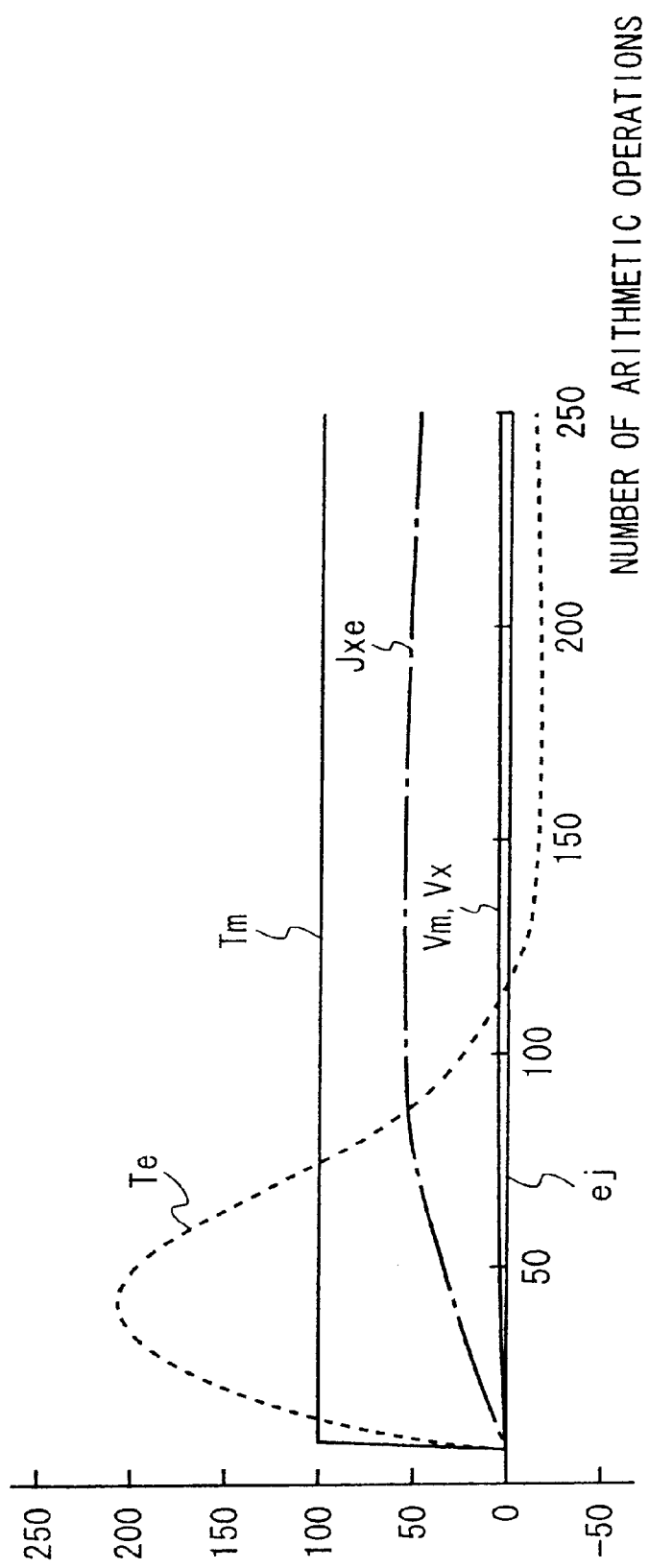
FIG. 5 is a characteristic curve chart showing characteristics of the adaptive control unit in FIG. 1.

FIG. 5 is a characteristic curve chart using the number of arithmetic processes as a horizontal axis to show results of simulation that detects the moment of inertia Jxe and the load Td caused by the disturbance. In this case, the motor M to be controlled set the moment of inertia Jx to a value of 50, and the motional friction coefficient Dm to 10, and the standard mathematical model 40 set the moment Jm of inertia to 10, the motional friction coefficient Dm0 to 10, and the gains Kg and Ki to 160 and 80 respectively. In the simulation, the control object value Tm is rapidly raised at the tenth sampling, and after that, a change in the error ej, etc., is observed. Finally, at the 250th sampling, a value of 47.9 was obtained as the moment of inertia Jxe by the adaptive control unit 36, and the load −9.6 caused by the disturbance was detected, whereby it was confirmed that the moment of inertia of the motor M and the load caused by the disturbance can be detected in a practically sufficient range.

Accordingly, in the legged mobile robot 31, each servo circuit 32 notifies the optimization regulator 34 at the higher position of the moment of inertia Jx and the load Td caused by the disturbance which are detected as described above, whereby the moment of inertia of a motor, etc., can be detected without providing a force sensor, a contact sensor, etc., for each region, and the amount of operation is changed based on a result of the detection to enable the solution of the problems in the conventional legged mobile robot.

In other words, in the legged mobile robot 31, the optimization regulator 34 detects, based on the notification, a change in the load, etc., when, for example, each foot touches the ground, and based on a result of the detection, the amount of operation that corrects the control value by the control command generator 11 is generated and output to each servo circuit 32. In each servo circuit 32, the control value eV for the driving circuit 35 is corrected based on the amount of operation.

At this time, the control object value which is output from the control command generator 11 to each servo circuit is input to the optimization regulator 34, and the control object value is used as a reference to generate the amount of operation, whereby, for example, while control object values for walking on a flat floor are sequentially being output from the control command generator 11, when the floor on which the legged mobile robot 31 moves is flat, the moment of inertia Jxe of each motor and the load Td caused by the disturbance are detected so as to cope with a change in each control object value. When each control object value is appropriately set by the detection, the motor M is driven by each servo circuit, performing two-leg walking on the float floor, without using the amount of operation to correct each control object value output from the control command generator 11.

Figure 6:
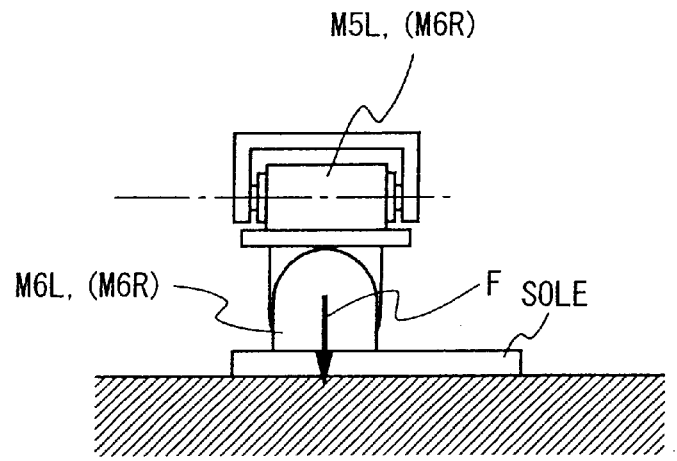
FIG. 6 is a side view illustrating an operation in the case where walking on a flat floor is performed.

In other words, in the case of walking on the flat floor, when the sole touches the ground, as shown in FIG. 6, the load moment of inertia, which has been a small value, increases, and the increase is detected by the optimization regulator 34. In this case where walking on the flat floor is performed, when such increase in the load moment of inertia is set beforehand so as to be adapted for the control object value for each actuator, in the egged mobile robot 31, control of each actuator performed until the sole touches the ground, and control performed after the sole touches the ground change in accordance with prior settings, whereby accidents such as falling is prevented, enabling stable walking.

Differently therefrom, for example, while similar control object values are being output from the control command generator 11, when the floor on which the legged mobile robot 31 moves inclines, or the floor is rough, the floor inclination or the roughness cause each motor M to have a change in the moment of inertia and the load caused by the disturbance, and in accordance with the change, the optimization regulator 34 generates the amount of operation, which corrects the control object value. Accordingly, control object values for motors, etc., constituting the ankle joint and the knee joint are corrected so that a region touching the floor is inclined in accordance with, for example, the roughness of the floor, whereby unstable movements, which are caused by a disturbance which is difficult to predict, are prevented.

At this time, in the legged mobile robot 31, in the motor M as an actuator, the adaptive control unit 36 in the driving circuit 35 detects the moment of inertia of the motor M and the load caused by the disturbance, and the driving circuit 32 that drives the driving circuit 35 can drive the motor M by outputting a control value, similarly to the case where a conventional driving circuit, as described with reference to FIG. 8, which does not detect the moment of inertia and the load caused by the disturbance, is driven.

Figure 7:
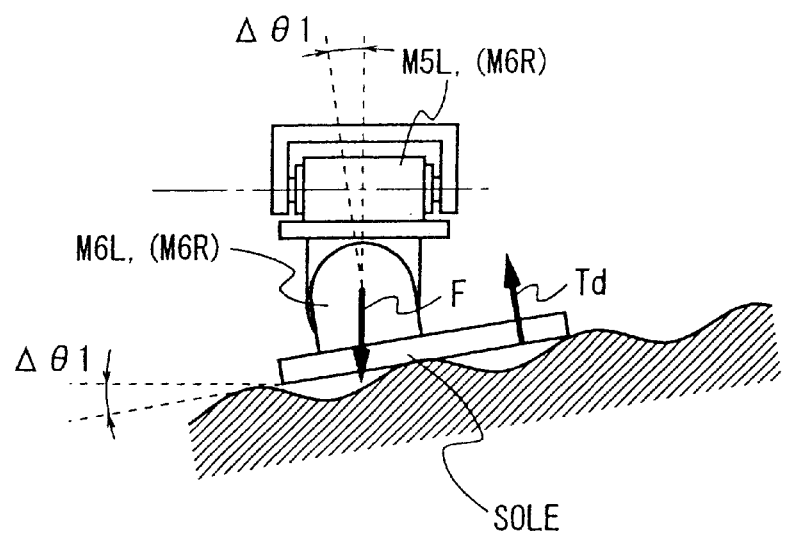
FIG. 7 is a side view illustrating an operation in the case where walking on a rough ground is performed.

In other words, as shown in, for example, FIG. 7, in the case where walking on an upward floor is performed, compared with the case where walking on the flat floor is performed, the sole touches the ground earlier, and the load moment of inertia that has been a small value increases. In this case, the optimization regulator 34 corrects the control value in accordance with the sole inclination Δθ by detecting the increase in the load moment of inertia, corrects the center of gravity so that the position of the center of gravity copes with the disturbance, in other words, so that a condition is established which is similar to the case where the sole touches the ground when walking on the flat floor is performed, and switches control of the sole in back and forth directions, whereby accidents such as falling is prevented, enabling stable walking.

In addition, in the legged mobile robot 31, the optimization regulator 34 generates, instead of each sensor provided for each region, the amount of operation, based on the moment of inertia sent from each servo circuit, and on the load caused by the disturbance. This enables the legged mobile robot 31 to omit a sensor provided for each region as provided in the conventional legged mobile robot, and the entire construction can be small-sized and simplified by the omission, and the operation speed can be accelerated.

(3) Effects of the Embodiment

According to the above-described construction, by driving the motor M based on the control value Tm, the response Vm from the motor M to be driven and the response Vm0 from the model 40 of the motor M, the moment of inertia of the motor M can be detected, and therefore, the moment of inertia of a thing to be driven can be detected in real-time without providing any special sensor.

In other words, in a servo system that controls the angle of a joint, by correcting the control value Tm so that the response Vm from the motor M to be driven is set to equal to the response Vm0 form the model 40 of the motor M, and also by detecting, based on a result of the correction of the control value Tm, at least the moment of inertia of the motor M, an object to be driven can be detected in real-time without providing any special sensor.

This enables the robot to use a simplified structure to prevent unstable operations caused by a disturbance, and to have an accelerated moving speed.

In addition, by using arithmetic processing to execute detection processing of the moment of inertia in the adaptive control unit, changing the processing program, as required, can cope with various changes.

(4) Other Embodiments

In the foregoing embodiment, a static friction coefficient is regarded as small and is not considered. However, the present invention is not limited to the cases, but also a static friction coefficient may be detected. In this case, the value of the static friction coefficient is rapidly reduced by applying a torque not less than a constant, whereby the torque Tm is corrected by providing a corrector based on a transfer function having the opposite characteristic at a stage after the adder 38B, the value can be detected based on a correction value from the corrector.

In the foregoing embodiment, a moment of inertia and a load caused by a disturbance are detected. However, the present invention is not limited to the case, but in a system having a less load change caused by a disturbance, only a moment of inertia may be detected.

In the foregoing embodiment, an actuator by a motor is driven. However, the present invention is not limited to the case, but can widely be applied to cases such as a case where an actuator by a linear motor is driven.

In the foregoing embodiment, a moment of inertia or the like is detected after correcting a control value for a motor as an object to be driven. However, the present invention is not limited to the case, but the moment of inertia or the like may be detected after correcting a control value for a standard mathematical model, as required, and the moment of inertia may be detected after correcting the two control values.

In the foregoing embodiment, the present invention is applied to a robot that walks with two legs. However, the present invention is not limited to the case, but can widely be applied to a robot that walks with four legs, a robot that moves using tires, an actuator having built-in servo circuits and driving circuits of various types.

INDUSTRIAL APPLICABILITY

This present invention can be applied to a legged mobile robot.

What is claimed is:

1. A servo circuit comprising:
   an actuator driving system for driving actuators in accordance with control values;
   a model driving system for driving models of the actuators in accordance with the control values; and
   control means which corrects each control value to be input to said actuator driving system and said model driving system so that a response from each actuator and a response from each model coincide with each other, detects at least the moment of inertia of each actuator from a result of the correction, and uses the result of the detection to correct each control value to be input to said actuator driving system and said model driving system;

correcting means using a predetermined gain to correct each control value, so that the response from each actuator and the response from each model coincide with each other; and said correcting means using the gain to correct the moment of inertia of each model, and detects the moment of inertia of each actuator;

driving means correcting each control value by setting said control value to an offset value, so that the response from each actuator and the response from each model coincide with each other; and said driving means detecting a load caused by a disturbance, by correcting the motional friction coefficient of each model using the offset value, and uses the load caused by the disturbance to correct each control value.

2. An actuator including:

a driver driving system for driving a driver in accordance with a control value;

a model driving system for driving a model of the driver in accordance with the control value; and correcting means for correcting the control value, which is input to said driver driving system and said model driving system, so that a response from said driver driving system and a response from said model driving system coincide with each other; wherein at least the moment of inertia of the driver is detected from a result of the correction by said correcting means and is output;

wherein the response from the driver and the response from the model coincide with each other by correcting the control value using a predetermined gain; and wherein the gain is used to correct the moment of inertia of the model, and the moment of inertia of the driver is detected;

said correcting means correcting the control value by setting the control value to an offset value, so that the response from the driver and the response from the model coincide with each other; and the offset value is used to correct the motional friction coefficient of the model, and a load caused by a disturbance is detected and output.

* * * * *